(12) United States Patent
Hadoulias et al.

(10) Patent No.: US 9,544,945 B2
(45) Date of Patent: Jan. 10, 2017

(54) MAGNETIC INDUCTION HEAT ENGINE AND HEAT PIPE DELIVERY SYSTEM AND METHODS OF PRODUCING AND DELIVERING HEAT

(71) Applicant: Inductive Engineering Technology, LLC, Cocoa Beach, FL (US)

(72) Inventors: Stamatios Hadoulias, Rockledge, FL (US); Darryl L. Snyder, Sarasota, FL (US); John C. May, Cocoa Beach, FL (US)

(73) Assignee: Inductive Engineering Technology, LLC, Cocoa Beach, FL (US)

( * ) Notice: Subject to any disclaimer, the term of this patent is extended or adjusted under 35 U.S.C. 154(b) by 0 days.

(21) Appl. No.: 15/051,604

(22) Filed: Feb. 23, 2016

(65) Prior Publication Data

US 2016/0255681 A1    Sep. 1, 2016

Related U.S. Application Data

(60) Provisional application No. 62/121,489, filed on Feb. 26, 2015.

(51) Int. Cl.
*H05B 6/10* (2006.01)
*H05B 6/06* (2006.01)
(Continued)

(52) U.S. Cl.
CPC ............ *H05B 6/06* (2013.01); *F24D 19/1084* (2013.01); *F24H 1/0018* (2013.01); *F24H 1/106* (2013.01);
(Continued)

(58) Field of Classification Search
CPC ............... H05B 6/04; H05B 6/06; H05B 6/14; H05B 6/101; H05B 6/103; H05B 6/105; H05B 6/106; H05B 6/108; H05B 6/109; H05B 6/365; H05B 6/1209; H05B 6/129; F24H 1/0018; F24H 1/106; F24H 1/201; F24H 3/002; F24H 3/022; F24H 2250/08; F24D 5/02; F24D 19/1084; F24D 2200/08
(Continued)

(56) References Cited

U.S. PATENT DOCUMENTS 3,651,240 A * 3/1972 Kirkpatrick ............. F27D 11/02
219/540
5,131,461 A * 7/1992 Szucs .................... F28D 1/0477
165/104.31
(Continued)

FOREIGN PATENT DOCUMENTS

WO    WO 2005022955 A1 * 3/2005 ............. H05B 6/108
WO    WO 2007091749 A1 * 8/2007 ............. H05B 6/108

OTHER PUBLICATIONS

PCT International Search Report and Written Opinion issued in PCT/US2016/019927, mailed on May 11, 2016, 8 pages.

*Primary Examiner* — Hung D Nguyen
(74) *Attorney, Agent, or Firm* — Knobbe, Martens, Olson & Bear, LLP (57) ABSTRACT

A magnetic induction thermal heat unit, capable of producing heat by magnetic field, inducing direct agitation and friction, at the molecular level within a ferrous magnetic or semi-magnetic substrate. The substrate is specifically designed to capitalize on storing the heat generated and then transferring the heat generated to a subsequent device that requires or uses heat as its primary energy source. The system can use both a combination of induction heated substrates that are ferrous or magnetic in various configurations. The substrates can also be joined or bonded to non-magnetic or ferrous materials such as aluminum or copper as a conductive heat path to a heat pipe system where a transfer of thermal energy occurs. Additionally, convective
(Continued)

and resultant radiant heat from the magnetic induction system can be directed back into the cumulative total of heat energy produced. The major objective ultimately being able to produce a greater degree of efficiency per given watt of electricity beyond what is currently available with current technology.

23 Claims, 11 Drawing Sheets

(51) Int. Cl.
| | |
|---|---|
| *F24H 1/00* | (2006.01) |
| *F24H 3/00* | (2006.01) |
| *H05B 6/04* | (2006.01) |
| *H05B 6/12* | (2006.01) |
| *F24H 1/10* | (2006.01) |
| *F24H 1/20* | (2006.01) |
| *F24H 3/02* | (2006.01) |
| *F24D 19/10* | (2006.01) |
| *F24D 5/02* | (2006.01) |

(52) U.S. Cl.
CPC .............. *F24H 1/201* (2013.01); *F24H 3/002* (2013.01); *F24H 3/022* (2013.01); *H05B 6/04* (2013.01); *H05B 6/108* (2013.01); *H05B 6/1209* (2013.01); *H05B 6/129* (2013.01); *F24D 5/02* (2013.01); *F24D 2200/08* (2013.01); *F24H 2250/08* (2013.01)

(58) Field of Classification Search
USPC ................ 219/618, 628, 629, 630, 634, 672
See application file for complete search history.

(56) References Cited

U.S. PATENT DOCUMENTS

| | | |
|---|---|---|
| 5,841,244 A | 11/1998 | Hamilton et al. |
| 2004/0060927 A1 | 4/2004 | Kim et al. |
| 2004/0240182 A1 | 12/2004 | Shah |
| 2005/0006380 A1 | 1/2005 | Kagan |
| 2005/0095168 A1* | 5/2005 | Centanni ................... A61L 2/07 422/3 |
| 2008/0223852 A1 | 9/2008 | Bassill et al. |
| 2009/0092384 A1 | 4/2009 | Luo et al. |
| 2010/0163549 A1 | 7/2010 | Gagas et al. |
| 2011/0215089 A1* | 9/2011 | Garza ...................... H05B 6/04 219/628 |

* cited by examiner

MAGNETIC INDUCTION HEAT ENGINE AND HEAT PIPE DELIVERY SYSTEM AND METHODS OF PRODUCING AND DELIVERING HEAT

PRIORITY

This application claims priority to U.S. Application No. 62/121,489, filed Feb. 26, 2015, which is incorporated by reference in its entirety into this application.

BACKGROUND

Conventional heat sources presently use radiant, resistive, infra red, quartz and other sources of energy similar in nature using electrical current produced or procured from standard residential or commercial electrical power distribution sources, or from fossil-fueled heat sources or burners. An exemplary conventional system supplies current through a resistive material to heat the material. Air or other convective medium is then used to transfer the heat from the resistive material to a remote location of interest. Such systems are extremely inefficient as there is substantial loss in heating the resistive material and transporting the heat convectively to the remote location.

Induction heating uses a magnetically conductive material, such as a ferrous metal, metal compound, or metal alloy, by inducting circulating currents within the material (the receptor) using an alternating magnetic field. An exemplary conventional induction heating system is for cook oven surfaces that directly heat the cookware within the magnetic field produced by an alternating current supplied to a ferrous metal pan positioned on the cook surface. These however require special cookware. Typically, magnetic induction devices are single purpose systems built specifically for an identified application where a single heating parameter is specified. Also, since the heated material must be within the magnetic field created by an alternating magnetic field to generate heat, these systems require substantial space at the location of generating heat. These systems therefore are typically limited to larger heating systems where heat is provided in a limited and immediate space.

SUMMARY

Exemplary heating systems described herein include heat engines powered by magnetic induction and thermal transfer mediums for use as thermal energy distribution systems. In general, the exemplary heat engine produces a high efficiency source of thermal energy that may be used to supplement or replace conventional heaters.

DESCRIPTION

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Exemplary embodiments provided herein provide systems and methods in which magnetic induction heating can be effectively and safely used to provide a reliable, cost efficient method of heating for a multitude of uses. In an embodiment, a magnetic induction thermal heat unit is disclosed, capable of producing heat by magnetic field, inducing direct agitation and friction, at the molecular level within a ferrous magnetic or semi-magnetic substrate. The substrate is specifically designed to capitalize on storing the heat generated and then transferring the heat generated to a subsequent device that requires or uses heat as its primary energy source. The system can use both a combination of induction heated substrates that are ferrous or magnetic in various configurations. The substrates can also be joined or bonded to non-magnetic or ferrous materials such as aluminum or copper as a conductive heat path to a heat pipe system where a transfer of thermal energy occurs. Additionally, convective and resultant radiant heat from the magnetic induction system can be directed back into the cumulative total of heat energy produced. The major objective ultimately being able to produce a greater degree of efficiency per given watt of electricity beyond what is currently available with current technology.

Although embodiments of the invention may be described and illustrated herein in terms of specific applications, it should be understood that embodiments of this invention are not so limited, but are additionally applicable to any number of other applications in which a heat source is needed. Furthermore, although embodiments of the invention may be described and illustrated herein in terms of specific configurations and materials, it should be understood that embodiments of the invention also include other alternatives as would be apparent to a person of skill in the art. Exemplary embodiments of specific configurations are provided herein. Features, arrangements, components, and functions may be interchanged between embodiments, such that any component, arrangement, or function may be integrated, subdivided, duplicated, added, removed, or otherwise combined or rearranged with any other embodiment described herein.

Figure 1:
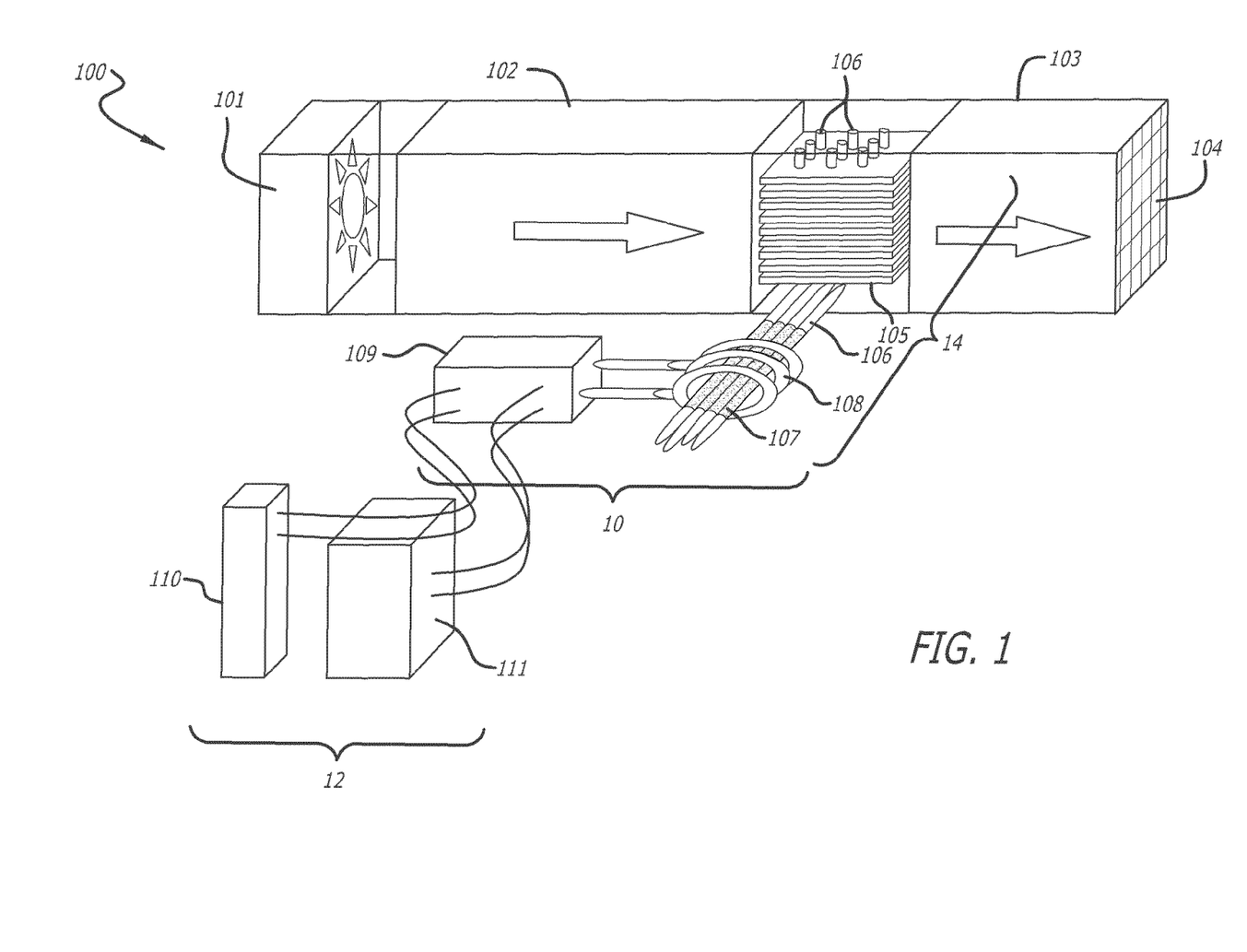
FIG. 1 illustrates an exemplary magnetic induction system having a heat engine, controller, and heat transfer device according to embodiments described herein.

FIG. 1 illustrates an exemplary magnetic induction system having a heat engine 10, controller 12, and heat transfer device 14. The heat engine 10 is controlled by the controller 12 to produce heat in a desired temperature range and transfer the heat through heat transfer device 14 to the target destination.

Heat engine 10 can be used to replace an existing heat generating device in a variety of products, and may be used by itself or in conjunction with one or more other system components as described herein. The heat engine 10 may be portable or fixed. In an exemplary embodiment, the heat engine 10 includes an induction generator 109, induction coils 108, and substrate 107. The induction generator 109 produces an alternating or changing current through induction coils 108 that creates the alternating or changing magnetic field. An exemplary embodiment of the heat engine 10 includes an electromagnet through which a high-frequency alternating current (AC) is passed. Positioned within the generated, alternating magnetic field is a substrate. The substrate may be a magnetic or ferrous metal that can be agitated at the molecular level by the generated magnetic field.

The exemplary heat engine uses magnetic induction where capacitive and inductive reactance create resonant frequencies of magnetic fields and/or eddy currents, electrical currents, magnetic flux densities, and combinations thereof to directly agitate the molecular structure of magnetic or ferrous metals to the point where immediate heating from accelerated atomic particle friction occurs to the metal substrate directly within the magnetic field.

The heat engine 10 is configured to create a magnetic field sufficient to accelerate at the molecular level, particles in the substrate 107 to the point of producing efficient heat. The efficiency of the heating occurs at the magnetically induced substrate level eliminating or reducing the losses typically encountered through conventional heating devices employing multiple substrate surfaces and conduction through various material compositions.

In an exemplary embodiment, the heat engine can be located remote from the ducting, heat exchanger, heat transfer device, or final target for the generated heat. Therefore, the heat energy from the heat engine may be channeled to a remote location with negligible or reduced thermal losses along at least a length to the remote destination. The heat engine (or heat source) can be separated from the destination target allowing flexibility to incorporate multiple design configurations for new product development, or retrofitting into existing products. For example, the heat from the heat engine or magnetic induction source can be transported by a heat pipe, convection, conduction, fluid transfer mechanisms via thermally conductive or eutectic solutions, hot plates, finned coils, heat sinks, or other known heat transfer mechanisms, and combinations thereof.

The exemplary heat transfer device includes a heat pipe that combines principles of both thermal conductivity and phase transition to efficiently manage the transfer of heat between two interfaces. At the hot interface of a heat pipe, a liquid in contact with a thermally conductive solid surface turns into a vapor by absorbing heat from the hot conductive surface. The vapor then travels along the heat pipe to the cold interface and condenses back into a liquid—releasing the latent heat. The liquid then returns to the hot interface through capillary action, centrifugal force, gravity, and combinations thereof to repeat the cycle. Due to the very high heat transfer coefficients for boiling and condensation, heat pipes are highly efficient thermal conductors.

As shown, the heat transfer device 14 may include heat pipes 106 and heat exchanger 105. The heat pipes 106 may be used to transfer the heat from the heat engine 10 to a remote target location or other heat transfer device, such as the convention HVAC ducting (including fan 101 and duct 102 and duct 103). The heat pipes may be coupled to the substrate 107 to receive heat from the heat engine 10. The heat is then transported through the heat pipes 106 to a remote location and/or other heat transfer device, such as heat exchanger 105. The heat exchanger, for example, may transfer the heat generated by the heat engine 10 to an airflow, such as moved by fan 101 along duct 102. As the air passes the heat exchanger 105, the air is heated and transported to another destination by duct 103 and vent 104.

Figure 9A:
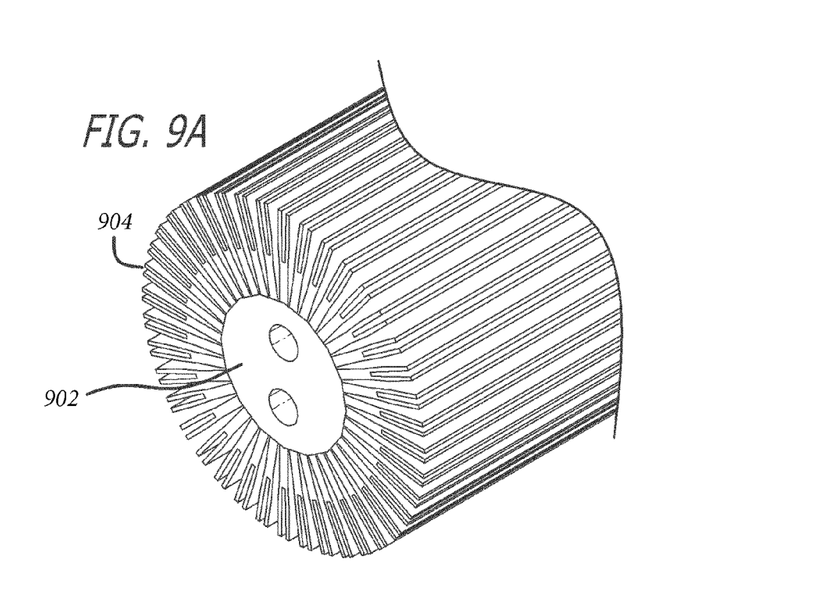
FIGS. 9A and 9B illustrate exemplary heat exchangers used in conjunction with exemplary embodiments described herein.
Figure 9B:
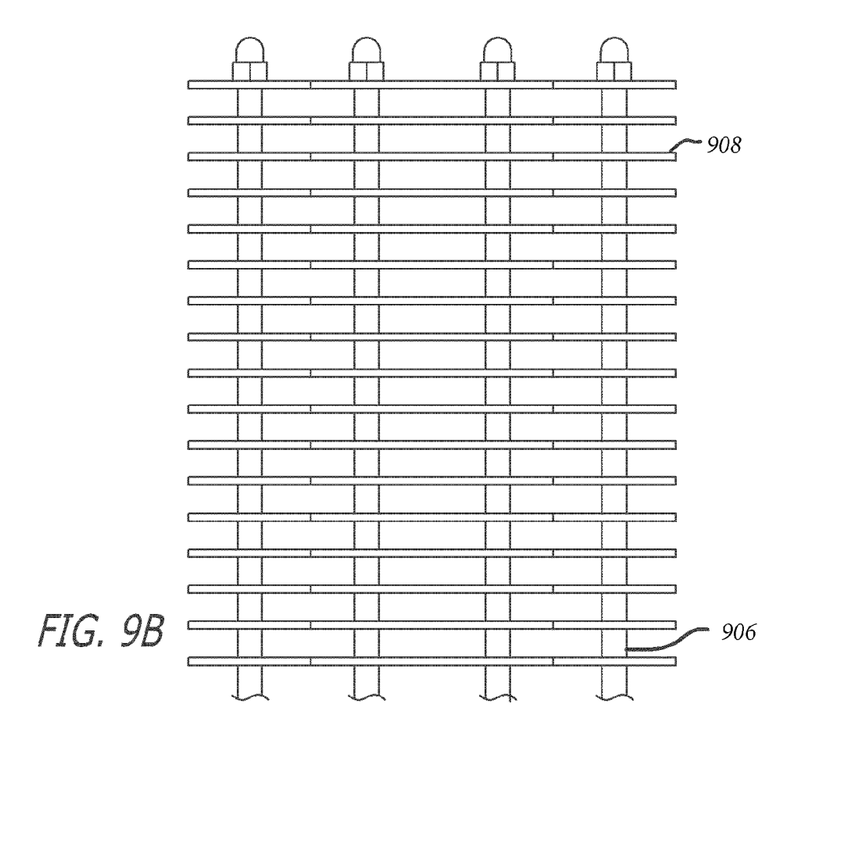

Heat Exchangers as described can be of a variety of configurations specific to the application thermal requirements. These can include finned type, heat sinks of thermally conductive material, extruded aluminum or other metal, ferrous or non-ferrous of high thermal conductivity configured to maximize the transfer of heat energy to the desired receptor. Some examples are, but not limited to, those illustrated in FIGS. 8A and 8B. As seen in FIG. 9A, the heat exchanger may define a solid central core 902 for which the heat pipes enter, and a peripheral edge of fins 904 or projections in the generally radial direction. The heat pipes transfer thermal energy to the heat sink core 902 and outward to the fins 904 which are cool by a passing fluid such as air or liquid. FIG. 9B provides a similar concept but the heat pipes 906 are directly exposed in the heat exchanger to the transfer fluid and uses a plurality of planar heat exchange surfaces 908. As shown, the planar heat exchange surfaces 908 are generally planar and parallel to each other. The heat pipes traverse through a plurality of planar heat exchange surfaces 908. As shown, the heat pipes 906 extend generally perpendicular to the heat exchanger surfaces 908, but may extend at any angle to facilitate fluid flow and heat transfer of and to the heat exchange medium. The planar heat exchange surface 908 may include passages for the heat pipes 906, and may include passages, apertures, projections, or other features for permitting, limiting, and/or directing fluid flow through the heat exchanger.

An exemplary embodiment further includes a controller for the heat engine so that the magnetic energy can be focused or dynamically adjusted to reach a desired or maximum heat potential in various alloys, substrate configurations, thermal sinks and/or other combined magnetic induction and thermal conduction methods as necessary to produce the required heat capacity requirements for a particular application. For example, an exemplary embodiment of the heat engine may be dynamically adjusted so that the magnetic energy may be tuned or adjusted to correspond to one of a plurality of interchangeable substrates or dynamically adjusted to produce a desired or controlled heat output from a single substrate.

An exemplary embodiment employs a magnetic induction circuit capable of resolving and producing magnetic fields specifically tailored for the configuration of the substrate surface directly affected and induced by the surrounding induction coil. The coil orientation and configuration can be altered to produce different patterns of magnetic fields, polarity, or configured to meet the physical dimensions of the substrate configuration within its field. Conventional induction systems are designed with a single frequency, single voltage, for a predefined substrate, with essentially an on/off cycle controlled by a temperature transducer to read "over shoot" and "under shoot" temperature ranges. This produced a magnetic field cycled over a very wide and imprecise range of temperature and time variance that is inconsistent at best. Accordingly, exemplary embodiments described herein may incorporate adequate safety features, while retaining the ability to specifically tailor and program preset parameter ranges. Exemplary embodiments may be controlled in real time or semi real time with electronic logic devices to meet varying applications with a single or multiple circuit board design. Exemplary embodiments may therefore be used to generate a specific and stable temperature range, along with the ability to accommodate varying levels of magnetic materials. Exemplary embodiments may also be used to control magnetic field penetration depths within multiple substrate configurations and temperatures.

In an exemplary embodiment a magnetic induction circuit board may be used to provide radio frequency (RF) energy so that the frequency of the RF energy emitted as the magnetic field into the substrate can be frequency modulated. The magnetic field into the substrate may therefore be selected to correspond to specific requirements, such as to correspond to the density and magnetic attraction of the specific substrate. The magnetic field can therefore be focused to the particular substrate or operating parameter.

Figure 2:
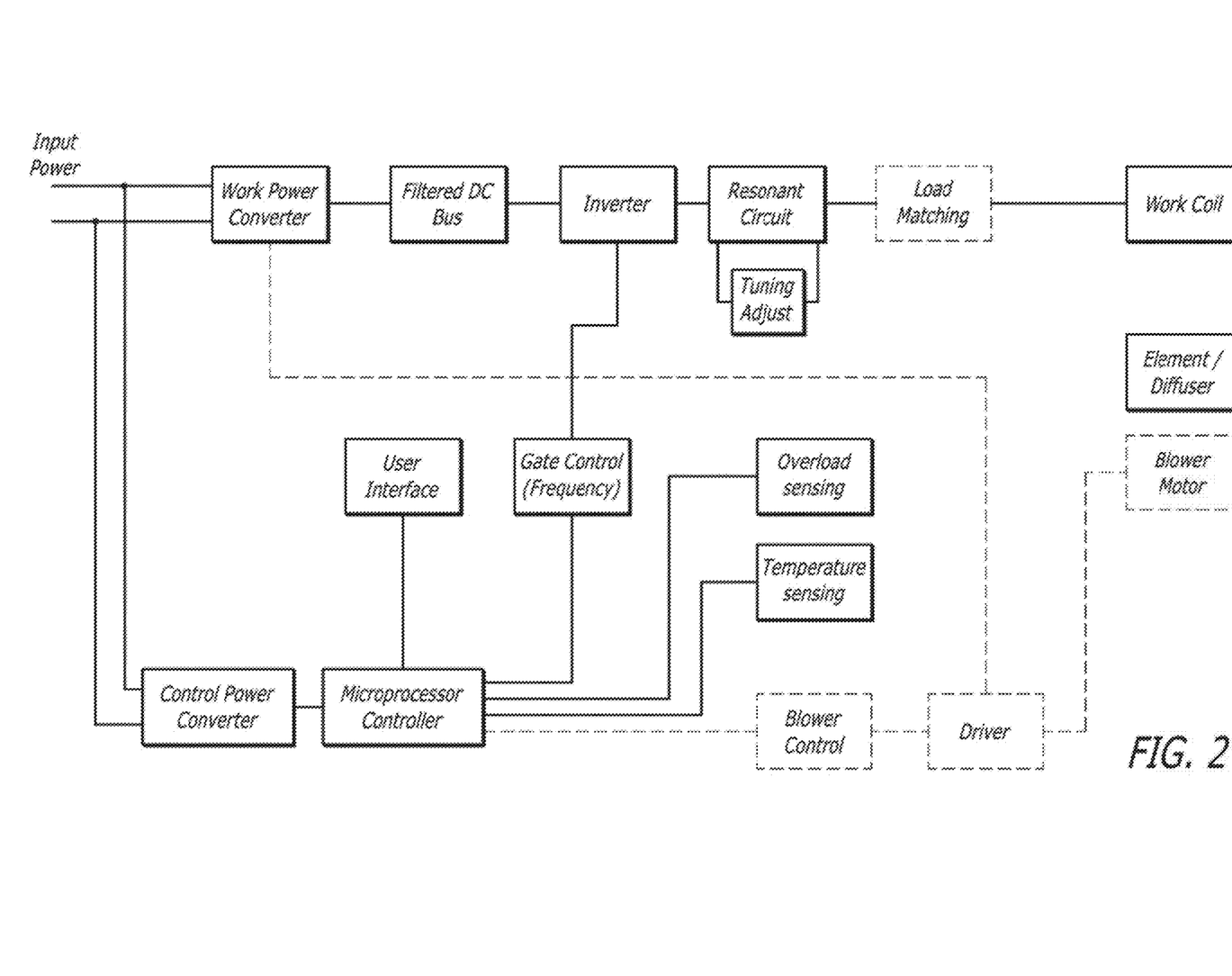
FIG. 2 illustrates an exemplary controller block diagram according to embodiments described herein.

Exemplary induction controls 110 are illustrated in FIG. 2. Control of the induction system consists largely of solid state components that may include switches, digital readouts, thermocouples or other measurement and logic devices. The controls may be used to facilitate intelligent function of the power generating circuits providing the RF energy to the induction coil and heat transfer system. The controls may take into consideration certain temperature ranges at the inlet and output stages, power application and proportionate power settings to maximize the efficiency of the overall induction system. This can include the power generating portion, the complete hybrid system using heat pipes and heat exchangers. The controller may also include components for fans and fluid control devices within the entire unit and also to monitor safety and effective resource management of the complete assembly for its intended use. As an RF modulated device, frequency generation, measurement and control may also be included in the control panel circuitry. However, in an exemplary embodiment the system may remain at a fixed operational frequency fixed by dedicated resonant components.

Coil cooling lines 111 and coil cooling pump unit 111 may also or alternatively be used for controlling induction coils 108 and induction generator 109 temperatures within specified limits.

Exemplary embodiments may be used to track, store, and analyze the modulated frequency, voltage, current parameters, substrate material, substrate configuration, output temperature, and other system parameters to define and populate a database. The database can be used to define baseline information to permit a single component or group of system components to function in a multitude of ways for a multitude of applications.

Exemplary embodiments may therefore include a logic engine or computer system to evaluate and determine a proper magnetic induction parameter or set of parameters to control and/or anticipate system output requirements and system design outcomes based on one or more system inputs, system configurations, system components, and combinations thereof.

Induction heaters may be used in numerous applications such as melting, forming, annealing, and welding metals in industrial applications. In domestic household applications, induction heaters have been used to heat cooking vessels on stove tops, or heat water for different applications including steam production for humidification and on-demand water systems. Other applications may include heating systems for use in heat, vacuum, and air conditioning (HVAC) systems. Conventional HVAC systems that may benefit from embodiments described herein include furnace, space heaters, and supplemental heaters for localized or targeted heat distribution within a larger heating system.

The first exemplary configuration may be used as a furnace in a conventional HVAC arrangement for a dwelling. The heat engine may be used as a heat source, with the heat pipes used as a heat transport to the secondary heat exchanger/heat transport of a conventional HVAC arrangement. For example, the electrical controls 110 may be coupled to or integrated into the thermostat within a room, the heat engine 10 may replace the conventional furnace, and heat transfer device 14 move the heat from the furnace to the HVAC duct 102 and duct 103 of the dwelling.

In an exemplary embodiment, the magnetic induction heat source may be used as a furnace where large quantities of air can be heated and distributed within a room for localized personal comfort or auxiliary heating in conjunction with HVAC systems already in place or as a stand alone unit. For example, the magnetic induction heat source may be designed into a or retrofitted into an existing HVAC air handling equipment replacing the heat strips typically used for emergency heat in reverse cycle heat pump units. For another example, the magnetic induction heat source may be used to directly heat the coils of a conventional "A" coil in an evaporative type freon expansion and compressor type HVAC system. The coils may also or alternatively be heated by the heat pipe.

Figure 3A:
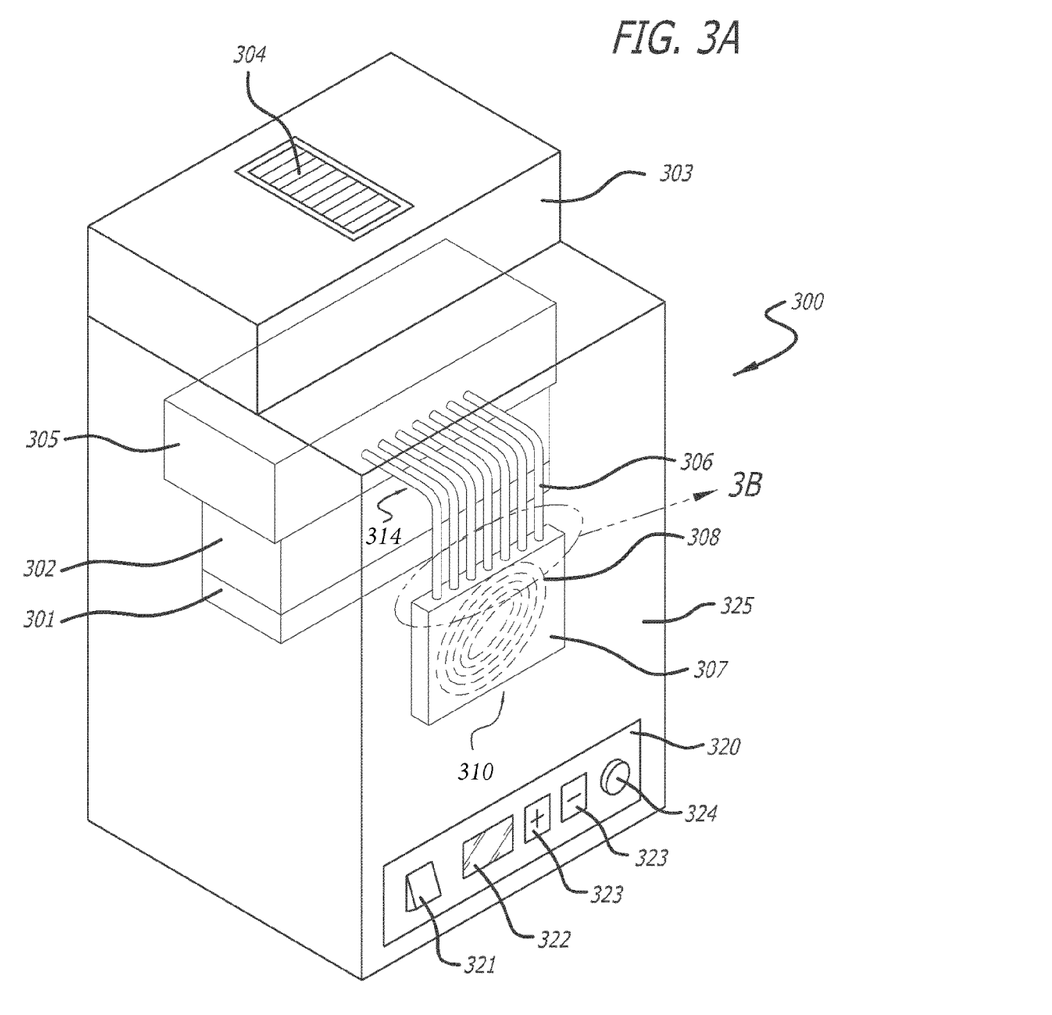
FIG. 3A illustrates an exemplary application of embodiments described herein including a furnace.
Figure 3B:
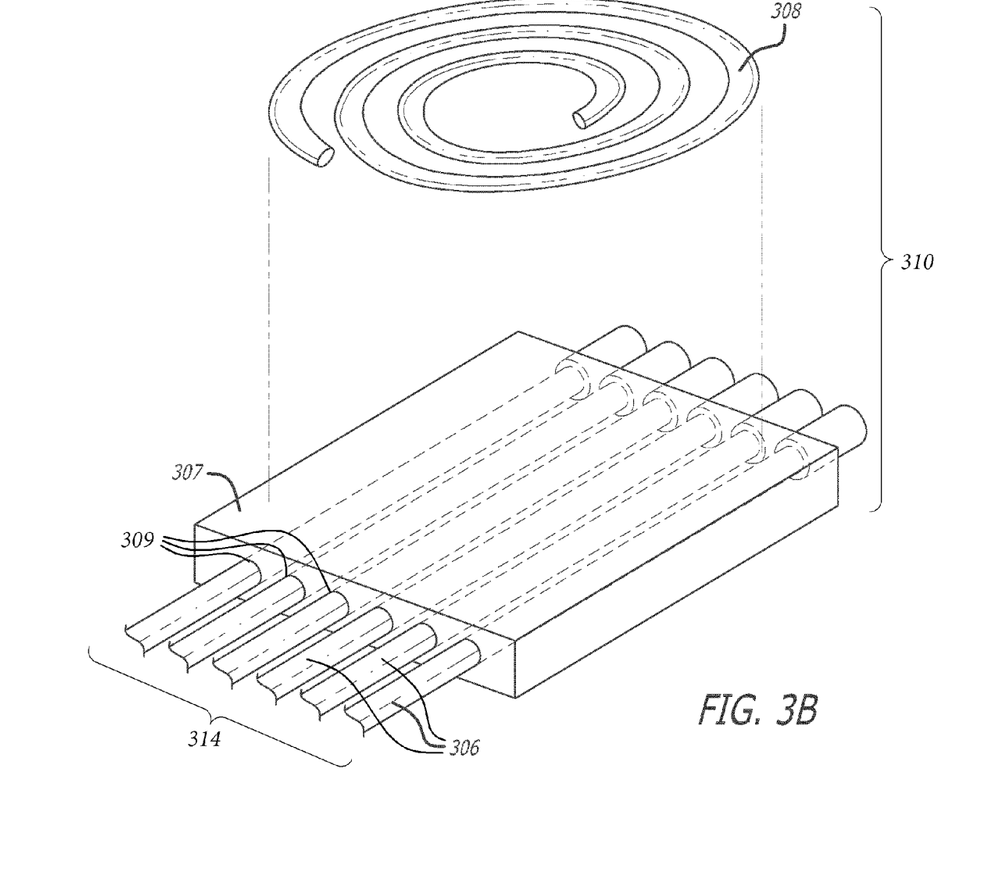
FIG. 3B is a close up view of a portion of the application indicated in FIG. 3A.

FIG. 3 illustrates an exemplary application in which embodiments described herein are configured as a furnace. The furnace 300 includes a housing 325 that encloses the heat engine 310 and at least a portion of the heat transfer device 314. The heat engine 310 includes a coil 308 and substrate 307. The substrate may be a ferrous metal positioned radially within the coil and/or at or outside one or both terminal ends of the coil.

The furnace 300 also includes a heat transfer device 314 comprising a plurality of heat pipes 306 extending through the substrate 307. As shown, the substrate 307 encloses at least a portion of the heat pipes 306. Therefore, a portion of the heat pipes 306 are integrated into and/or circumferentially surrounded by a portion of the substrate 307. In an exemplary embodiment, the substrate 307 defines an extension of an interior wall of the heat pipes 306, such that the heat pipes 306 extend directly from the substrate 307. Alternatively or in addition thereto, the substrate 307 may define a contact surface either as an indentation on the substrate surface and/or as an aperture or through passage 309 within the substrate 307 in which the heat pipes 306 contact either directly or indirectly.

The heat pipes 306 may be fully contained within the housing 325 and couple directly to a heat exchanger 305 within the housing 325 to transfer the heat from the heat engine 310 to the air source, or may extend outside of the housing 325 and integrate or couple into another portion of the HVAC or heating system. If contained within the housing 325, the housing may also include a plenum or duct 303 to transport the heated air to the desired location and/or vent 304 to expel the air from the furnace. The duct 303 may take on any configuration as necessary to direct the heated air as desired.

As shown in the FIG. 3 exemplary embodiment, the coil 308 is in a planar configuration, such that the coil 308 lies generally within a plane. Adjacent turns of the coil therefore lie radially outward or inward from subsequent turns to make a closed spiral. The substrate 307 similarly has a planar configuration and lies adjacent to or in contact with the coil 308. The magnetic field of the coil 308 therefore penetrates at least a portion of the substrate 307. The substrate 307 has a plurality of aligned or generally aligned through passages 309 that define a contact wall. The plurality of heat pipes 306 pass through the substrate 307 and contact the contact wall defined by the through passages 309 in the substrate 307. The heat pipes 306 then travel vertically to the heat exchanger 305 and transfer heat from the heat engine 310 to the remote location to warm an air stream. Exemplary embodiments may also be used to heat a fluid stream, gas stream, medium, or object.

The furnace 300 may also include controls 320 to setting a desired temperature or flow speed. For example, the unit may be powered by an outside or internal power source. The unit may include a power switch 321 to turn the unit on and off. The unit may also include temperature controls 323 for raising the output temperature or lowering the output temperature. The unit may also include a fan control speed 324 for setting the fan or blower speed and adjust the throughput of the system. The unit may also include an output 322 such as a display to show a temperature, flow rate, current usage, etc. to a user to assess their input or output of the system. The controls 320 may be located remote from the furnace or may be integrated into the housing.

In an exemplary embodiment, the magnetic induction heat source may be remotely mounted and the thermostatic control placed in a remote register as a supplemental boost for room comfort temperature and control in a long reach ducting system where adequate heat from the HVAC air handler is insufficient for providing stable temperature or airflow, or is not able the thermostatically control temperatures in individual rooms. Therefore, the duct 303 may extend along, be positioned separately, or run in parallel to an existing HVAC duct to reach one or more specific spaces within a larger system. Control may be provided by individual thermostatic controls in each room or by a master control at the unit or common control location.

Figure 4A:
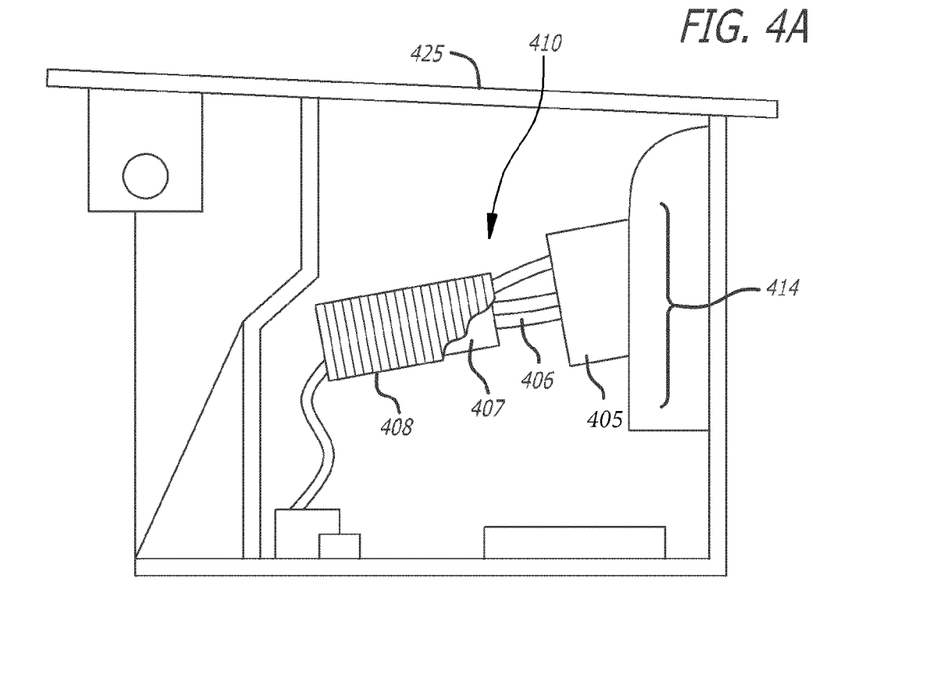
FIG. 4A illustrates an exemplary application of embodiments described herein including a space heater.
Figure 4B:
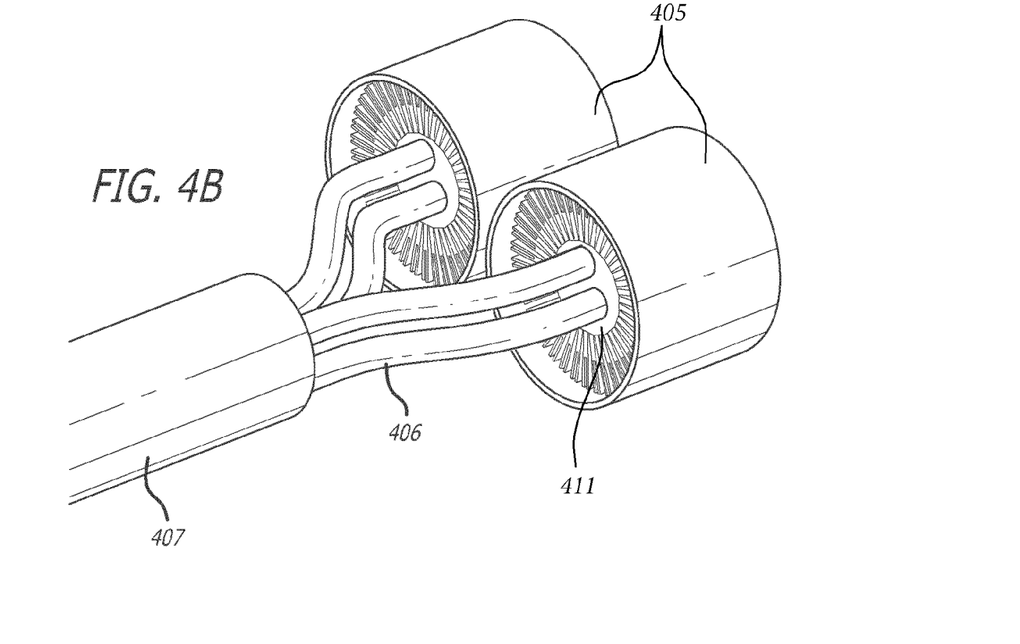
FIG. 4B is a close up view of a portion of the application of FIG. 4A.
Figure 4C:
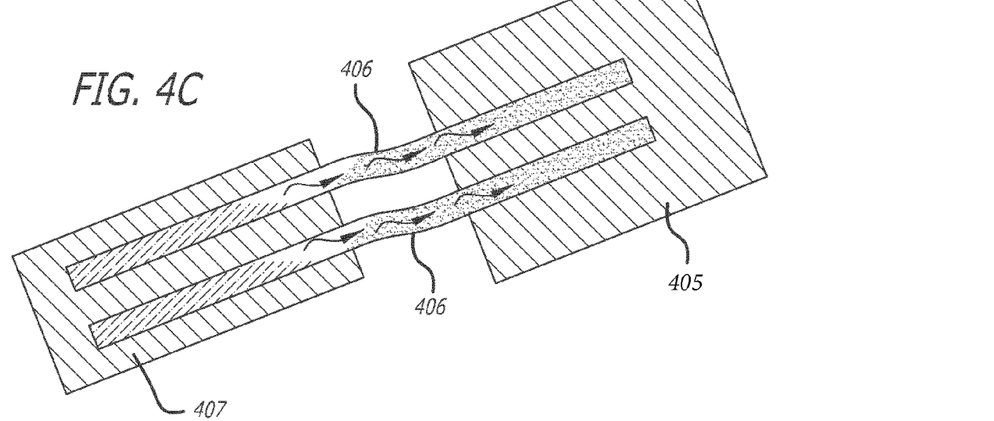
FIG. 4C is a cut away view of FIG. 4B.

The second exemplary configuration may be used as a space heater as illustrated in FIG. 4. Exemplary embodiments may be used to permit an occupant of a dwelling to turn down the thermostat on the heating system that serves the dwelling, whiling maintaining an elevated temperature locally, such as in one or more rooms or spaces.

As shown in FIG. 4, the space heater includes a portable housing 425. The portable housing 425 may include wheels or other mechanism to permit the unit to be easily moved from one location to another. The unit may also be lighter weight so that it can be picked up and carried. The housing may enclose heat engine 410 that includes a substrate 407, and coil 408 that interfaces and interacts with heat transfer device 414 including heat pipes 406.

Figure 5:
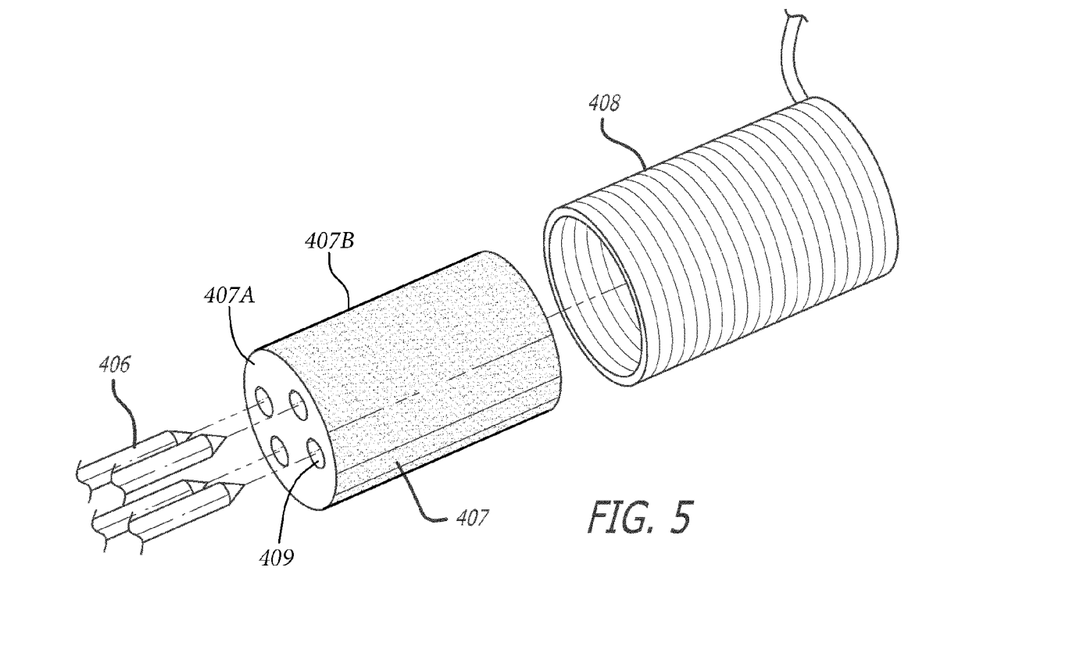
FIG. 5 illustrates an exploded view of an exemplary heat engine of FIG. 4.

In the exemplary embodiment illustrated in FIG. 5, the substrate 407 defines a cylindrical rod core 407A of aluminum with a ferrous metal sleeve 407B. Although a circular cylindrical rod is shown for illustration, other geometric cross sections of the core 407A, including varying or constant cross dimensions are contemplated herein. The substrate 407 includes a plurality of apertures 409 on one end sized to accommodate a plurality of heat pipes 406. The inner diameter of the aperture 409 therefore approximates the outer diameter of the heat pipe 406 so heat transfer between the substrate 407 and the heat pipe 406 is facilitated. An intermediary contact, substance, or object may be introduced between the heat pipe 406 and substrate 407 to further improve heat conduction between the heat pipe 406 and substrate 407. A coil 408 is wrapped to define a longitudinal axis that aligns with the substrate 407 cylindrical axis. The coil 408 may include a plurality of turns to define a hollow cylinder configuration. The coil 408 may have a cross section that approximates the size and/or shape of the outer perimeter cross section of the substrate 407 or may have a different cross section and/or size. As shown, heat pipes 406 are positioned within the substrate 407, which is positioned within the coil 408. The heat pipes 406 may be configured to provide radiant heat or may be used with a heat exchanger and/or fan to provide convective and/or conductive heat. The space heater may also include controls for setting a temperature, fan speed, or other input/output specifications.

The heat engine of FIG. 5 may be employed in the space heater of FIG. 4. As shown, four heat pipes 406 may extend through the substrate 407 and extend from the heat engine. The four heat pipes 406 may then couple to a heat exchanger. As shown, a plurality of heat exchangers 405 are used, such that the four heat pipes 406 are divided among two heat exchangers 405 (i.e. two heat pipes 406 per heat exchanger 405. The heat pipes 406 extend through a core 411 of the heat exchanger 405 as discussed further with respect to FIG. 9A, below. A fan may be positioned with a duct to a vent to move an airflow through the system, across the heat exchanger 405 and out of the unit. The fan and heat engine may be independent controlled such that the unit may supply a selectable temperature, or temperature range, and air flow speed.

Figure 6A:
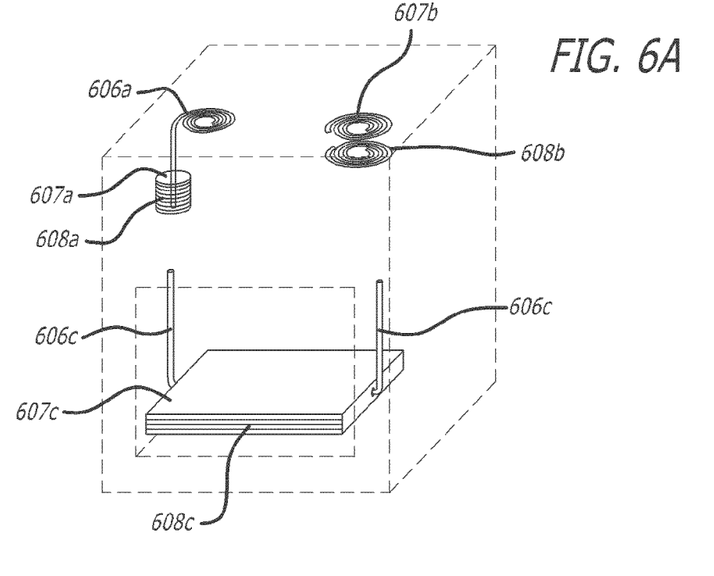
FIGS. 6A-6C illustrate exemplary applications of embodiments described herein including cooking surfaces and compartments.
Figure 6B:
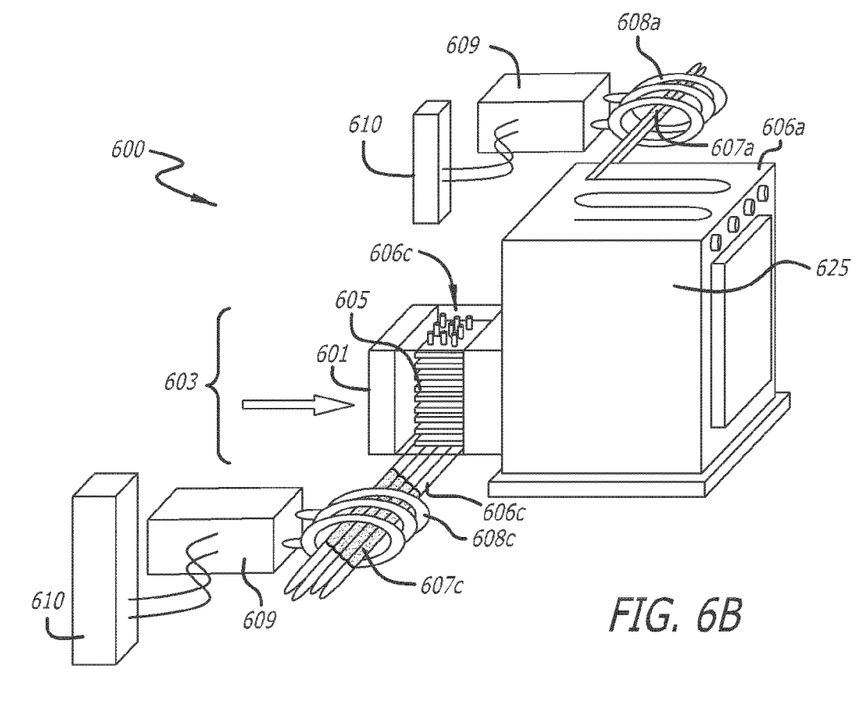
Figure 6C:
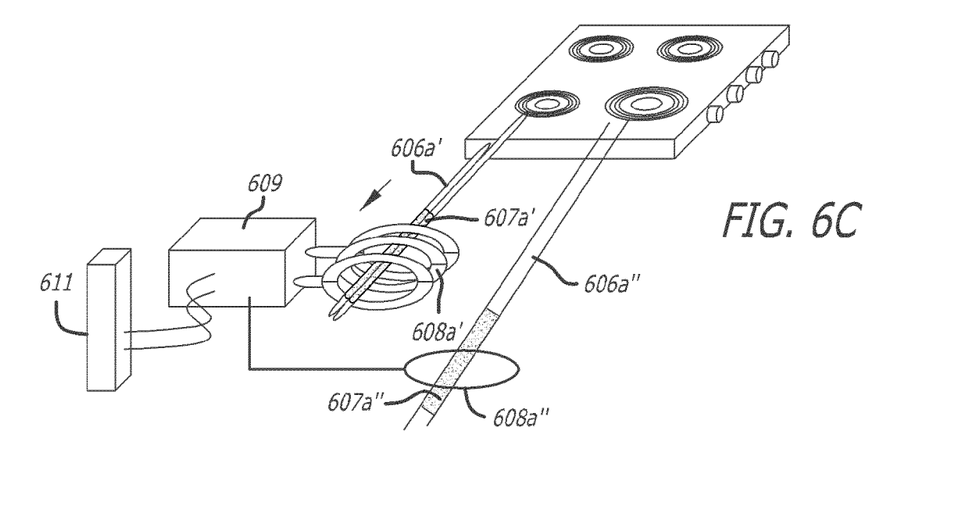

FIGS. 6A-6C illustrate exemplary applications of embodiments described herein including a stove and oven or other cook surfaces and spaces. As shown, the stove portion and/or the oven portion may take advantage of embodiments described herein.

For the stove top, a coil 608a and coil 608b may be used to heat a substrate 607a and substrate 607b, respectively. The substrate 607b may be directly on the stove top. In this configuration, the substrate/coil arrangement may be similar to that of FIG. 3 in which the coil and substrate are generally planar and positioned adjacent each other. The stove top may also take advantage of a heat transfer device such as heat pipe 606a to provide flexibility in positioning the heat engine within the stove/over. The heat pipe 606a configuration may be used, for example, to reduce the stove size for use in mobile or camp stove applications in which the size/configuration is limited or otherwise constrained. Since the heat pipes are the primary source of heat energy in this exemplary embodiment, the need for magnetic cookware as a substrate for a typical induction stove top is unnecessary. Exemplary embodiments described herein may be used with any conventional cookware.

For the oven, a coil 608c may be used to heat a substrate 607c positioned adjacent to or away from the interior oven space. Heat may be distributed around a periphery or throughout the interior oven space with heat transfer device, such as heat pipes 606c. The exemplary embodiment here may use a combination of the heat engines as illustrated in FIGS. 3 and 4. For example, the coil 608c may wrap around a substrate 607c. The substrate 607c may still be generally planar, while the coil is generally cylindrical (although short in longitudinal length) wrapped around the peripheral edge of the substrate. Heat pipes 606c may extend through the substrate and along the surface defining the interior cavity of the oven space. The heat pipes may be configured to create a desired heat distribution within the oven space.

FIG. 6B illustrates an exemplary configuration using two separate induction generators 609 and electrical controls 610 for controlling the oven space and cooktop surface separately. The cooktop surface is heated through induction coils 6088a and substrate 607a. The heating surface may include one or more heat pipes 606a above, at, integrated into, or under the cook surface. The heat pipes may be configured as conventional coiled heat spaces or may cover the entire cook surface. The heat pipes may be located such that the cook surface includes different heating zones or may include one or more additional generators and/or controls for adding heat to different heating areas to selectively control the heat provided to different areas of the cook surface. The illustrated heat surface may be used, for example, on an industrial stove top that heats a griddle type surface. Different combinations of coils and heat pipes may be used to create the desired heat distribution and selective control along the entire or different portions of the cooktop surface. FIG. 6C illustrates such an alternative in which one or more induction generators 609 are used to selectively control different plurality of coils 608a' and 608a" for heating different substrates 607a' and 607a" to different plurality of heat pipes 606a' and 606a" to selectively and controllably heat individual cooking regions along cook top. The oven space may be enclosed by a housing 625. Induction coils 608c are used to heat substrate 607c and transfer heat to heat pipes 606c. A convection oven is shown and therefore includes a duct assembly 603 for moving airflow by fan 601 through a heat exchanger 605 heated by heat pipes 606c.

Figure 7A:
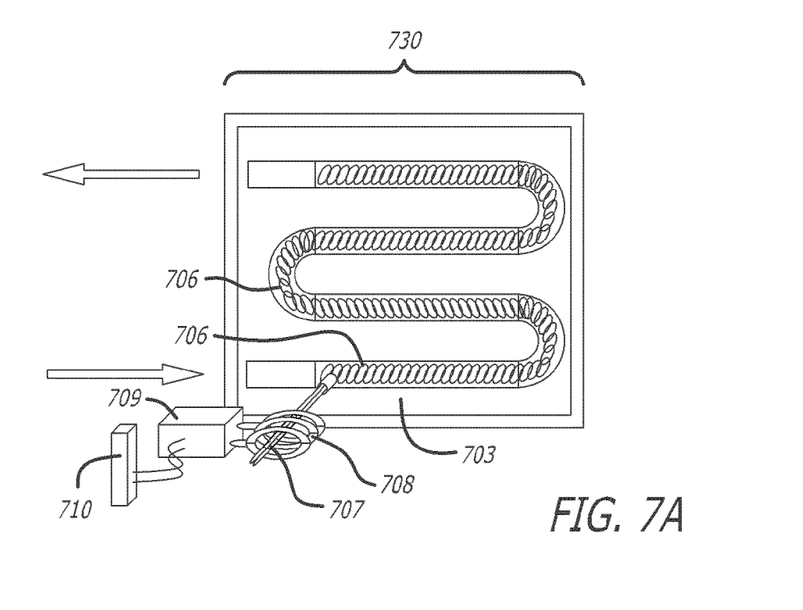
FIGS. 7A-7B illustrate exemplary applications of embodiments described herein including water heaters.
Figure 7B:
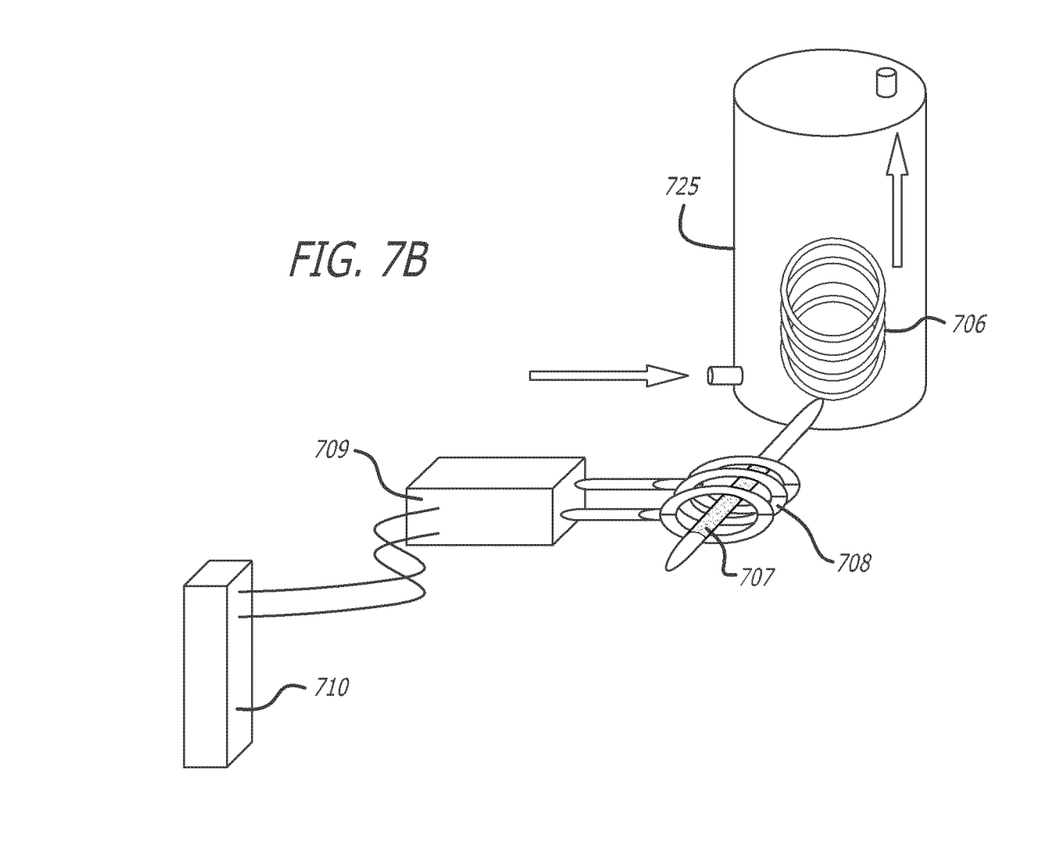

FIGS. 7A and 7B illustrate exemplary applications of embodiments described herein including heated water. FIG. 7A illustrates an exemplary instant on hot water heater, while FIG. 7B illustrates an exemplary hot water unit. The configuration of FIGS. 7A and 7B work similar to the other embodiments described herein. However, instead of transferring heat from the heat engine to an air source, the heat is transferred to the water held or passing through to create the desired hot water. In an exemplary embodiment, the coil and substrate may be directly positioned around a portion of the water pipe or water container. In other embodiments, the heat pipes may be used to remotely locate the heat engine from the water tap and a heat exchanger may be used to heat the passing water.

As illustrated in FIG. 7A, embodiments of an instant on hot water heater may include a substrate 707 inductively heated by coil 708, and controlled by induction generator 709 and electrical controls 710. The heat from the heat engine is transfer through heat pipes 706 in contact with water flowing through water pipes 703. As shown, the heat pipes may be spirally positioned within the water pipes and directly contact the flowing water to the water source to increase heat transfer to the passing water. The heat pipes may also be positioned in other configurations such as longitudinally or parallel along the water pipe 703. The heat pipes may also be positioned inside the pipe 703, outside the pipe 703, or a combination thereof. The entire system may be mounted by mount 730, such as to or within a wall or cabinet surface.

As illustrated in FIG. 7B, embodiments of a hot water heater and tank may include an induction generator 709 controlled by electrical controls 710 for selectively controlling coils 708 to heat substrate 707. The heat from the substrate may be directly in the water tank and directly or indirectly contact the water source or may be positioned on an outside of the water tank 725. The heat may be transferred from the substrate 707 to the interior space of the tank 725 by heat pipes 706. The heat pipes may be positioned as coils, grid, parallel and longitudinal straight lines or other combinations to effectively transfer the heat to the water. The heat pipes 706 may be used with other heat exchangers (not shown) to improve heat transfer from the heat engine to the water.

Figure 8:
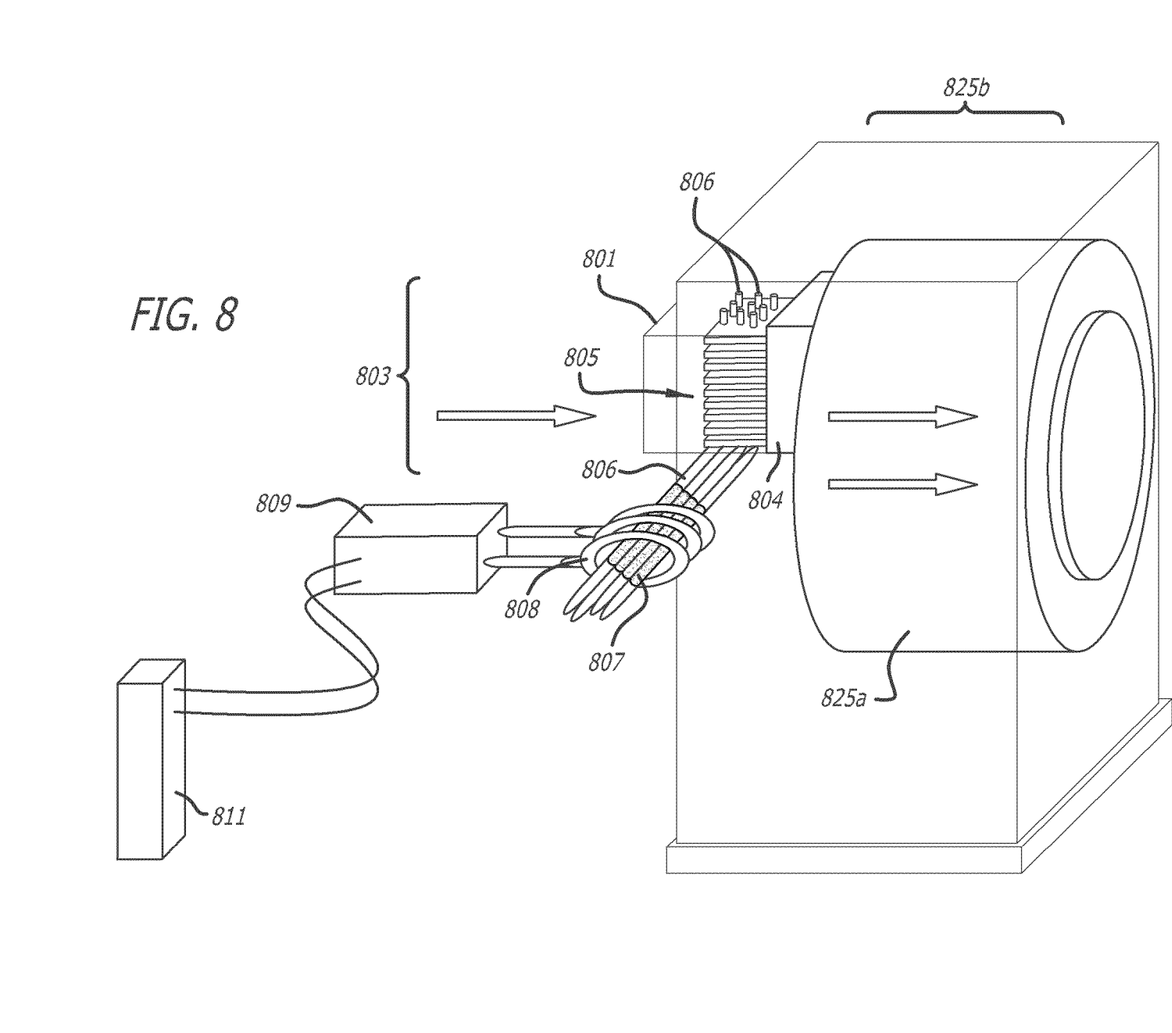
FIG. 8 illustrates an exemplary application of embodiments described herein including an air dryer.

FIG. 8 illustrates an exemplary application of embodiments described herein including a clothes dryer unit. The configuration of FIG. 8 works similar to that the convection over of FIG. 6B, but with a different heat selection range. Given the selective controls of the system, applications in which the temperature is selectively controlled (i.e. baking temperatures and/or drying temperatures) are available. Exemplary embodiments permit greater temperature control than previous designs making these applications available to inductive heating. The exemplary clothes dryer unit includes an electrical control 811 communicating with induction generator 809 for controlling induction coils 808 to selectively heat substrate 807. The substrate 807 transfers heat through heat pipes 806 to heat exchanger 805 to warm the air moved by fan 801 through duct 803 and into the dryer drum 825a. The system may be fully or partially contained within the dryer box 825b. The exemplary air dryer may also be modified for other air drying applications, such as a hand air dryer. Because the heat engine can be located remote from the air source for drying, the drying body may be kept small, while the heat source is located remotely, such as in a wall or other place.

Other exemplary applications include, but are not limited to hot water heaters, coffee roasters and brewing equipment, HVAC equipment, swimming pool heaters, high volume heaters such as garage or torpedo area heaters. Applications may also include heating other substrate materials and configurations as are commercially available or developed.

All methods described herein can be performed in any suitable order unless otherwise indicated. Exemplary embodiments do not impose a limitation on the scope of the invention. In addition, exemplary embodiments described include system components, features, and functionality that are exemplary only. These system components, features, and functionality may be substituted with their equivalents and/or combined, integrated, removed, duplicated, added, or otherwise provided in any reasonable combination nor subcombination from any one or more exemplary embodiments. Therefore, each exemplary embodiment is not intended to be mutually exclusive, but may be combined or recombined with other exemplary embodiments as would be apparent to a person of skill in the art. Therefore, any combination of the above described elements in all possible variations thereof is encompassed by the invention unless otherwise indicated herein or otherwise clearly contradicted by the context. The use of "and" and "or" is therefore interchangeable and any combination of the listed components, features, or functions may be used in any combination of elements.

Exemplary embodiments described herein are in terms of an induction generator, induction coil, substrate, and heat pipes. The induction generator may be any source for creating a variable magnetic field at the substrate through the coil. In an exemplary embodiment, this is simply an alternating current source. The alternating current source may be controllable such as by electrical controls described herein to adjust power levels, frequency, or other attributes to adjust the magnetic field. The induction coil is not limited to any specific shape or design. Although "coil" is used herein it is not limited to the conventional wrapped wire understanding. The induction coil of the instant application may be any interface for generating the magnetic field. For example, it may be a helically or spirally wound wire that has terminal ends coupled to the induction generator for passing an alternating current and producing a fluctuating magnetic field. The induction coil may also simply be a wire or a plurality of wires or other electrically conductive medium in any configuration, such as a plurality of straight wires in parallel (physically and/or electrically).

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

The invention claimed is:

1. A heat source apparatus, comprising:
an induction generator;
an induction coil operatively coupled to the induction generator and configured to create an adjustable magnetic field within a space;
a substrate positioned within at least a portion of the space, the substrate configured to generate heat when a changing magnetic field is applied thereto and including a plurality of passages extending at least partially therethrough;
a plurality of heat pipes, each enclosing a heatable solution, wherein at least a portion of each of the plurality of heat pipes is positioned in a distinct passage of the plurality of passages such that an interior surface of a passage of the plurality of passages is in contact with an exterior surface of a heat pipe of the plurality of heat pipes;
a heat exchanger thermally coupled to the plurality of heat pipes, wherein the plurality of heat pipes transfer the generated heat from the substrate to the heat exchanger; and
a fan configured to move an airflow across the heat exchanger.

2. The heat source apparatus of claim 1, further comprising a duct for directing the airflow from the heat exchanger.

3. The heat source apparatus of claim 2, further comprising an electrical controller configured to dynamically adjust a temperature generated by the heat source apparatus.

4. The heat source apparatus of claim 3, wherein the electrical controller is configured to control at least one of a power, a current, or a frequency, supplied by the induction generator to the induction coil.

5. The heat source apparatus of claim 1, wherein the substrate comprises a mass of non-ferrous material and a ferrous metal sleeve in physical contact with an exterior surface of the mass of non-ferrous material, wherein the plurality of passages extend at least partially through the mass of non-ferrous material.

6. The heat source apparatus of claim 5, wherein the induction coil comprises a helically wound wire located around an exterior surface of the substrate.

7. The heat source apparatus of claim 1, wherein the plurality of passages are a first plurality of passages and the at least a portion of each of the plurality of heat pipes is an at least a first portion of each of the plurality of heat pipes, and wherein the heat exchanger comprises a core including a second plurality of passages extending at least partially therethrough, wherein at least a second portion of each of the plurality of heat pipes is positioned in a distinct passage of the second plurality of passages.

8. The heat source apparatus of claim 7, wherein the heat exchanger further comprises fins extending radially outward from an exterior surface of the core.

9. The heat source apparatus of claim 8, wherein at least one fin of the fins splits to form two additional fins radially extending outward from an exterior end of the at least one fin.

10. The heat source apparatus of claim 1, wherein the plurality of heat pipes are positioned generally parallel in the heat exchanger, the heat exchanger comprising a plurality of sheets positioned perpendicular to the plurality of heat pipes to define a plurality of heat transfer spaces.

11. The heat source apparatus of claim 1, wherein the substrate comprises a mass of ferrous material, wherein the plurality of passages extend at least partially through the mass of ferrous material.

12. The heat source apparatus of claim 1, wherein the substrate is cylindrical.

13. The heat source apparatus of claim 1, wherein the plurality of heat pipes are positioned generally parallel in the substrate.

14. A heating apparatus, comprising:
a heat source, the heat source comprising:
an induction generator,
an induction coil operatively coupled to the induction generator and configured to create an adjustable magnetic field within a space,
a substrate positioned within at least a portion of the space, the substrate configured to generate heat when a changing magnetic field is applied thereto and including a plurality of passages extending at least partially therethrough,
a plurality of heat pipes, each enclosing a heatable solution, wherein at least a portion of each of the plurality of heat pipes is positioned in a distinct passage of the plurality of passages such that an interior surface of a passage of the plurality of passages is in contact with an exterior surface of a heat pipe of the plurality of heat pipes,
a heat exchanger thermally coupled to the plurality of heat pipes, wherein the plurality of heat pipes are configured to transfer the generated heat from the substrate to the heat exchanger, and
a fan configured to move an airflow across the heat exchanger; and
a housing enclosing at least a portion of the heat source.

15. The heating apparatus of claim 14, wherein the heating apparatus is an oven and further comprises a heating space, wherein the airflow is directed to the heating space.

16. The heating apparatus of claim 15, further comprising a duct to direct the airflow from the heat exchanger to the heating space.

17. The heating apparatus of claim 14, wherein the heating apparatus is a clothes dryer and further comprises a dryer drum, wherein the airflow is directed to a cavity defined by the dryer drum.

18. The heating apparatus of claim 17, further comprising a duct to direct the airflow from the heat exchanger to the dryer drum.

19. The heating apparatus of claim 14, wherein the heating apparatus is a space heater and the housing further comprises a vent.

20. The heating apparatus of claim 14, wherein the heating apparatus is a furnace and the housing further comprises a vent.

21. The heating apparatus of claim 14, wherein the at least a portion of the heat source that is enclosed within the housing comprises the heat exchanger and the fan.

22. The heating apparatus of claim 14, wherein the at least a portion of the heat source that is enclosed within the housing comprises the induction generator, the induction coil, the substrate, the plurality of heat pipes, the heat exchanger, and the fan.

23. The heating apparatus of claim 14, wherein the plurality of heat pipes are positioned generally parallel in the heat exchanger, the heat exchanger comprising a plurality of sheets positioned perpendicular to the plurality of heat pipes to define a plurality of heat transfer spaces.

* * * * *